US008708301B2

(12) United States Patent
Grammer et al.

(10) Patent No.: US 8,708,301 B2
(45) Date of Patent: Apr. 29, 2014

(54) HOLDER DEVICES AND METHODS OF MAKING AND USING THE SAME

(75) Inventors: Thomas G. Grammer, Northport, AL (US); Beverly C. Phifer, Tuscaloosa, AL (US)

(73) Assignee: Phifer Incorporated, Tuscaloosa, AL (US)

( * ) Notice: Subject to any disclaimer, the term of this patent is extended or adjusted under 35 U.S.C. 154(b) by 238 days.

(21) Appl. No.: 13/040,575

(22) Filed: Mar. 4, 2011

(65) Prior Publication Data

US 2011/0215214 A1    Sep. 8, 2011

Related U.S. Application Data

(60) Provisional application No. 61/310,520, filed on Mar. 4, 2010.

(51) Int. Cl.
*A47B 97/04* (2006.01)

(52) U.S. Cl.
USPC .............. 248/460; 248/461; 248/918; 211/11

(58) Field of Classification Search
USPC ........... 248/460, 917, 918, 176.1, 165, 440.1, 248/174; 211/11, 42, 43, 44, 45, 126.3
See application file for complete search history.

(56) References Cited

U.S. PATENT DOCUMENTS

| | | |
|---|---|---|
| 43,575 A | 7/1864 | Dimon et al. |
| 264,995 A | 9/1882 | Armstrong, Jr. |
| 352,654 A | 11/1886 | Morton |
| 542,809 A | 7/1895 | Reid |
| 582,140 A | 5/1897 | Nolon |
| 590,175 A | 9/1897 | Trussell |
| 793,978 A | 7/1905 | Beidler |
| 993,761 A | 5/1911 | Crane |
| 1,111,607 A | 9/1914 | Nyberg |
| 1,203,659 A | 11/1916 | Smith |
| 1,821,060 A | 12/1929 | Isaacson |
| 1,919,835 A | 12/1930 | Giese |
| 1,876,681 A | 9/1932 | Irwin |
| 1,996,191 A | 4/1935 | Cook |
| 2,003,746 A | 6/1935 | Headington |

(Continued)

FOREIGN PATENT DOCUMENTS

CN    2174093 Y    8/1994

OTHER PUBLICATIONS

International Search Report dated Jan. 25, 2008, PCT/US06/16608 (1 page).

(Continued)

*Primary Examiner* — Amy J Sterling
(74) *Attorney, Agent, or Firm* — Hunton & Williams LLP

(57) ABSTRACT

The invention provides holder devices and methods of making and using the same. The holder devices described may be used to hold a wide variety of personal electronic devices, as well as other items. Illustratively, the holder device may include a body portion, at least two holder sides, and an extension portion. Each of the holder sides may be disposed in slots in the body portion. The holder sides may be in the form of an elephant head, for example. The extension portion may be selectively positioned in either a stowed position, an extended position, or some interim position. In the extended position, or partially extended position, the extension portion provides enhanced stability to the holder device.

17 Claims, 9 Drawing Sheets

(56) References Cited

U.S. PATENT DOCUMENTS

| | | | |
|---|---|---|---|
| 2,136,701 A | | 11/1938 | Manierre |
| 2,489,553 A | | 11/1949 | Wofford |
| 2,627,694 A | | 11/1950 | Saecker |
| 2,572,731 A | | 10/1951 | Keith |
| 2,595,682 A | | 5/1952 | Lipa |
| 3,202,471 A | | 8/1965 | Wilson |
| 3,381,928 A | | 5/1968 | White |
| 3,484,226 A | * | 12/1969 | Golightly .................. 65/291 |
| 3,603,656 A | * | 9/1971 | Ferman .................. 312/195 |
| 3,908,215 A | * | 9/1975 | Watson .................. 412/9 |
| 3,952,989 A | | 4/1976 | Hatcher |
| 4,014,508 A | | 3/1977 | Weiss |
| 4,015,813 A | | 4/1977 | Graham |
| 4,043,530 A | | 8/1977 | May |
| 4,163,497 A | * | 8/1979 | McEwen .................. 211/11 |
| 4,163,539 A | | 8/1979 | Awofolu |
| 4,372,630 A | | 2/1983 | Fuhri |
| 4,380,947 A | | 4/1983 | Nishimoto |
| D269,188 S | | 5/1983 | Tisdale |
| 4,436,271 A | | 3/1984 | Manso |
| 4,471,933 A | | 9/1984 | Nelson |
| 4,560,072 A | * | 12/1985 | Burrell .................. 211/75 |
| 4,643,306 A | * | 2/1987 | Ryan .................. 206/425 |
| 4,863,124 A | | 9/1989 | Ball et al. |
| 4,896,252 A | | 1/1990 | Stewart |
| 4,948,139 A | | 8/1990 | Heeszel |
| 5,232,274 A | | 8/1993 | Johan et al. |
| 5,375,806 A | | 12/1994 | Debus et al. |
| 5,492,299 A | | 2/1996 | Thermos |
| 5,533,642 A | | 7/1996 | Lafond et al. |
| D373,600 S | | 9/1996 | Oimas |
| 5,577,628 A | | 11/1996 | O'Neil et al. |
| 5,607,135 A | | 3/1997 | Yamada |
| 5,651,525 A | | 7/1997 | Yang |
| 5,692,815 A | | 12/1997 | Murphy |
| 5,765,799 A | | 6/1998 | Weber |
| 5,797,578 A | | 8/1998 | Graffeo et al. |
| 5,823,500 A | | 10/1998 | La Coste |
| 5,855,329 A | | 1/1999 | Pagano |
| 5,855,351 A | | 1/1999 | Cziraky |
| 5,884,889 A | | 3/1999 | Crosby |
| 5,893,546 A | | 4/1999 | Renfroe |
| 5,944,209 A | | 8/1999 | Daoud |
| 5,974,707 A | * | 11/1999 | Kowalczyk .................. 40/124.4 |
| 6,000,663 A | | 12/1999 | Plasse et al. |
| 6,003,446 A | | 12/1999 | Leibowitz |
| 6,038,983 A | | 3/2000 | Lendl |
| 6,045,108 A | | 4/2000 | Cziraky |
| 6,085,917 A | | 7/2000 | Odom |
| 6,109,658 A | | 8/2000 | Moore |
| 6,134,103 A | | 10/2000 | Ghanma |
| 6,302,273 B1 | | 10/2001 | Edmunds |
| 6,311,944 B1 | | 11/2001 | McKsymick et al. |
| 6,353,529 B1 | | 3/2002 | Cies |
| 6,497,391 B1 | | 12/2002 | Timm |
| 6,540,192 B2 | | 4/2003 | Ouellet |
| 6,682,038 B2 | | 1/2004 | Golynsky |
| 6,749,228 B2 | | 6/2004 | Takemura |
| 6,751,878 B2 | | 6/2004 | Hamann |
| 6,971,622 B2 | | 12/2005 | Ziegler et al. |
| D514,057 S | | 1/2006 | Borunda et al. |
| 7,121,214 B1 | | 10/2006 | Toltzman et al. |
| 7,172,167 B2 | | 2/2007 | Phifer |
| 7,293,751 B2 | | 11/2007 | Eriksson |
| 7,770,864 B2 | | 8/2010 | Phifer et al. |
| 7,959,124 B2 | | 6/2011 | Phifer et al. |
| 8,123,189 B2 | | 2/2012 | Phifer et al. |
| 2002/0044819 A1 | | 4/2002 | Shamoon |
| 2003/0010884 A1 | | 1/2003 | Jones |
| 2003/0029985 A1 | | 2/2003 | Zeller et al. |
| 2004/0256534 A1 | | 12/2004 | Phifer et al. |
| 2005/0098703 A1 | | 5/2005 | Cziraky |
| 2005/0121594 A1 | | 6/2005 | Kuo |
| 2005/0285009 A1 | | 12/2005 | Phifer et al. |
| 2006/0108494 A1 | | 5/2006 | Lancet |
| 2006/0124822 A1 | | 6/2006 | Munda et al. |
| 2007/0221811 A1 | | 9/2007 | Hauser et al. |
| 2009/0179124 A1 | | 7/2009 | Caplan |
| 2009/0321605 A1 | | 12/2009 | Petrie |
| 2010/0006735 A1 | | 1/2010 | Reinen |

OTHER PUBLICATIONS

European Search Report dated Mar. 9, 2006, EP 04 71 5625 (2 pages).
International Search Report dated Aug. 29, 2005, PCT/US04/05705 (1 page).
International Search Report dated Aug. 9, 2007, PCT/US06/03005 (1 page).
"MyPlace Pro Workstation," www.asseenontv.com/prod-pages/my_pic_ontv.html, date unknown (1 page).
"Porta-Book," www.portabooktv.com/Default.asp?bhcp=1, date unknown (2 pages).
"You can do it Bindependent We Can Help, Adapt-A-Lap book Holder", Adapt-A-Lap book Holder, 4 pages from www.bindependent.com.
"Bodyguard, Nellie's Exercise Equipment . . . ", 1 page from nellies.com.
"Large and Small Paperbacks Stay . . . ", 1 page from store3.yimg.com.
"Relieve Neck and Back Pain, Improve Your Reading Immediately with Our Adjustable Book Holders", 4 pages from www.proportionalreading.com.
"AtlasTM Ergonomic Book & Copy Holders", 1 page from www.bookandcopyholders.com.
"Book Holders", 1 page from sfpl.lib.ca.us.
"You can do it Bindependent We Can Help, Two-Piece Tilting Table", 2 pages from www.bindependent.com.
International Search Report dated Apr. 27, 2011, PCT/US2011/027182 (1 page).

* cited by examiner 100 holder device 100 holder device 100 holder device

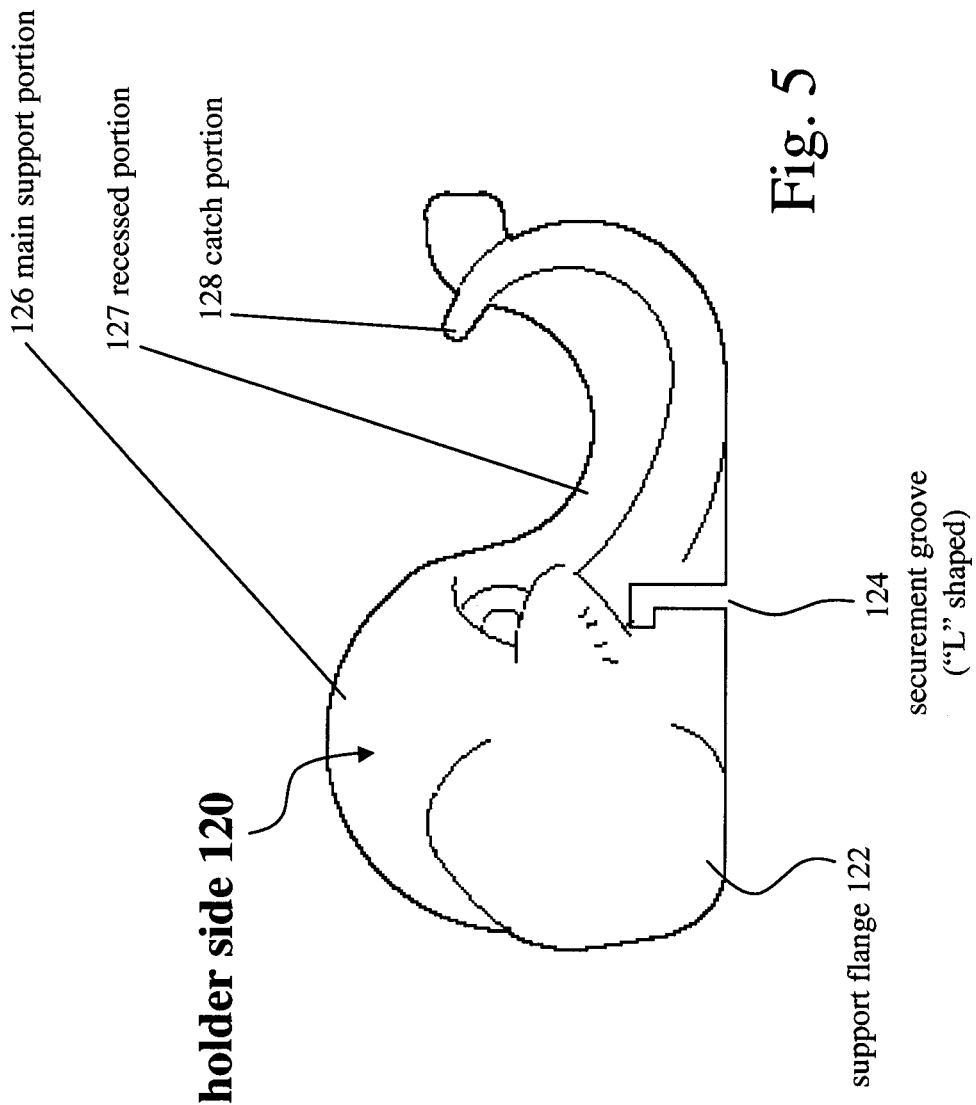

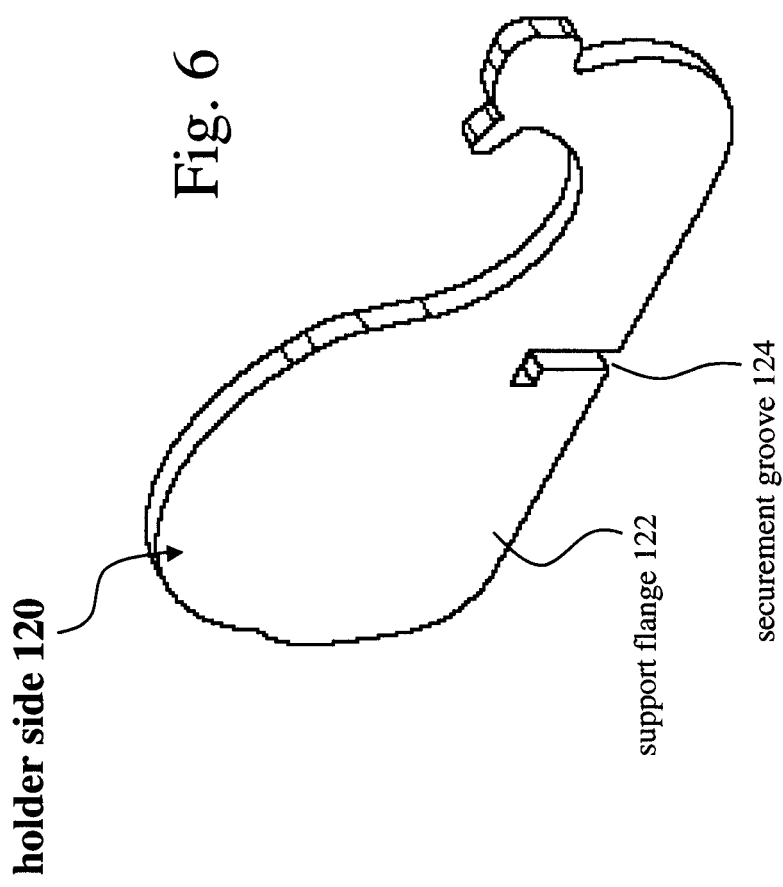

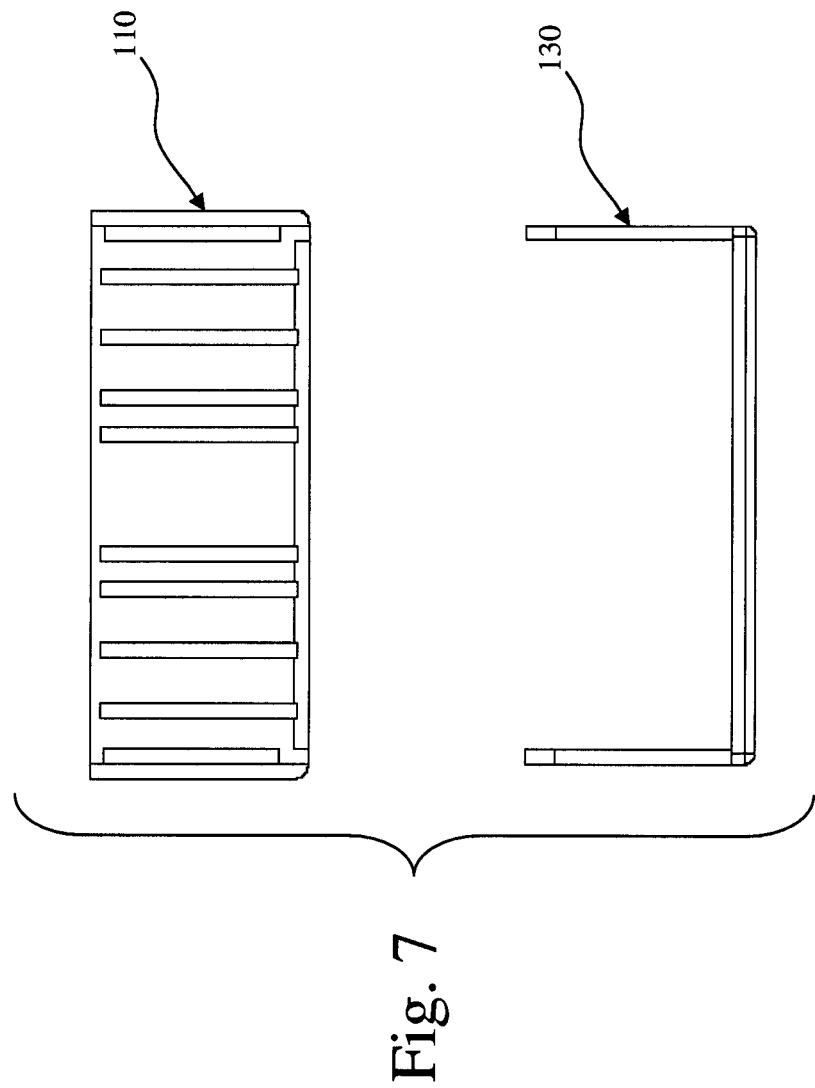

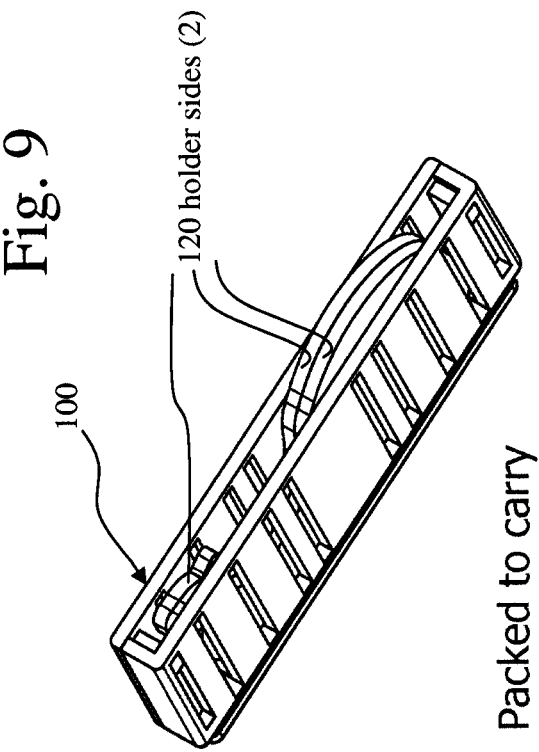
Packed to carry
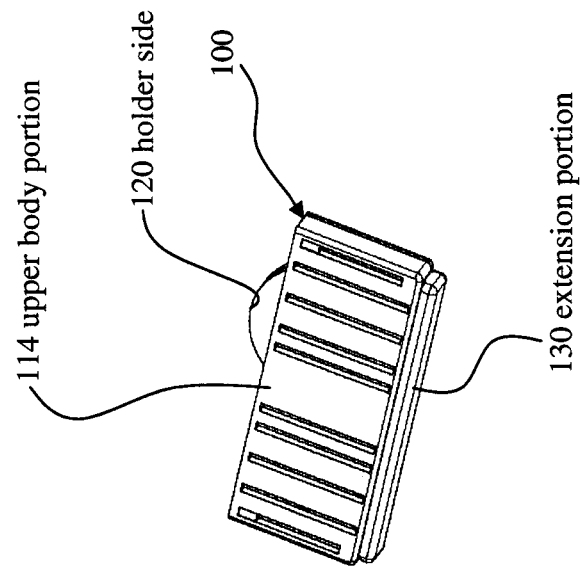

HOLDER DEVICES AND METHODS OF MAKING AND USING THE SAME

RELATED PATENT APPLICATION

This application claims priority to U.S. Provisional Patent Application 61/310,520 filed Mar. 4, 2010, the content of which is incorporated herein by reference in its entirety.

BACKGROUND OF THE INVENTION

The invention relates to devices to support a personal electronic device and other items.

Various devices have been used in the past to support personal electronic devices, such as a cell phone, personal digital assistant (PDA), or other item. However, known devices for supporting a personal electronic device have various deficiencies. Some known devices are not adaptable to hold a variety of devices. Other devices are lacking in their stability. Other problems exist with known devices.

BRIEF SUMMARY OF THE INVENTION

The invention provides a holder device for supporting an item upon the holder device. In one embodiment of the invention, the holder device may include a body portion including a plurality of body slots; a plurality of holder sides, each holder side including a support flange, the support flange of each respective holder side removably positioned in a respective body slot. The plurality of holder sides may be supported so as to be parallel to each other, with the plurality of holder sides adapted to support the item thereon.

Various other features are provided in accordance with the various embodiments of the invention.

BRIEF DESCRIPTION OF THE DRAWINGS

The present invention can be more fully understood by reading the following detailed description together with the accompanying drawings, in which like reference indicators are used to designate like elements, and in which:

FIG. 5 is a side view of a holder side in accordance with one embodiment of the invention.

FIG. 6 is a perspective view of a holder side in accordance with one embodiment of the invention.

FIG. 7 is a top view of the body portion with the extension portion separated in accordance with one embodiment of the invention.

FIG. 8 is a perspective view of the body portion in a packed arrangement in accordance with one embodiment of the invention.

FIG. 9 is a further perspective view of the body portion in a packed arrangement, from a different angle, in accordance with one embodiment of the invention.

DETAILED DESCRIPTION OF THE INVENTION

Hereinafter, aspects of the invention in accordance with various embodiments will be described. As used herein, any term in the singular may be interpreted to be in the plural, and alternatively, any term in the plural may be interpreted to be in the singular.

The invention provides holder devices and methods of making and using the same. The holder devices described may be used to hold a wide variety of personal electronic devices, as well as other items. In accordance with one embodiment of the invention, the holder device may include a body portion, at least two holder sides, and an extension portion. Each of the holder sides may be disposed in slots in the body portion. The holder sides may be in the form of an elephant head, for example. The extension portion may be selectively positioned in either a stowed position, an extended position, or partially extended position. In the extended position, or partially extended position, the extension portion provides enhanced stability to the holder device. Various other features are described below.

Figure 1:
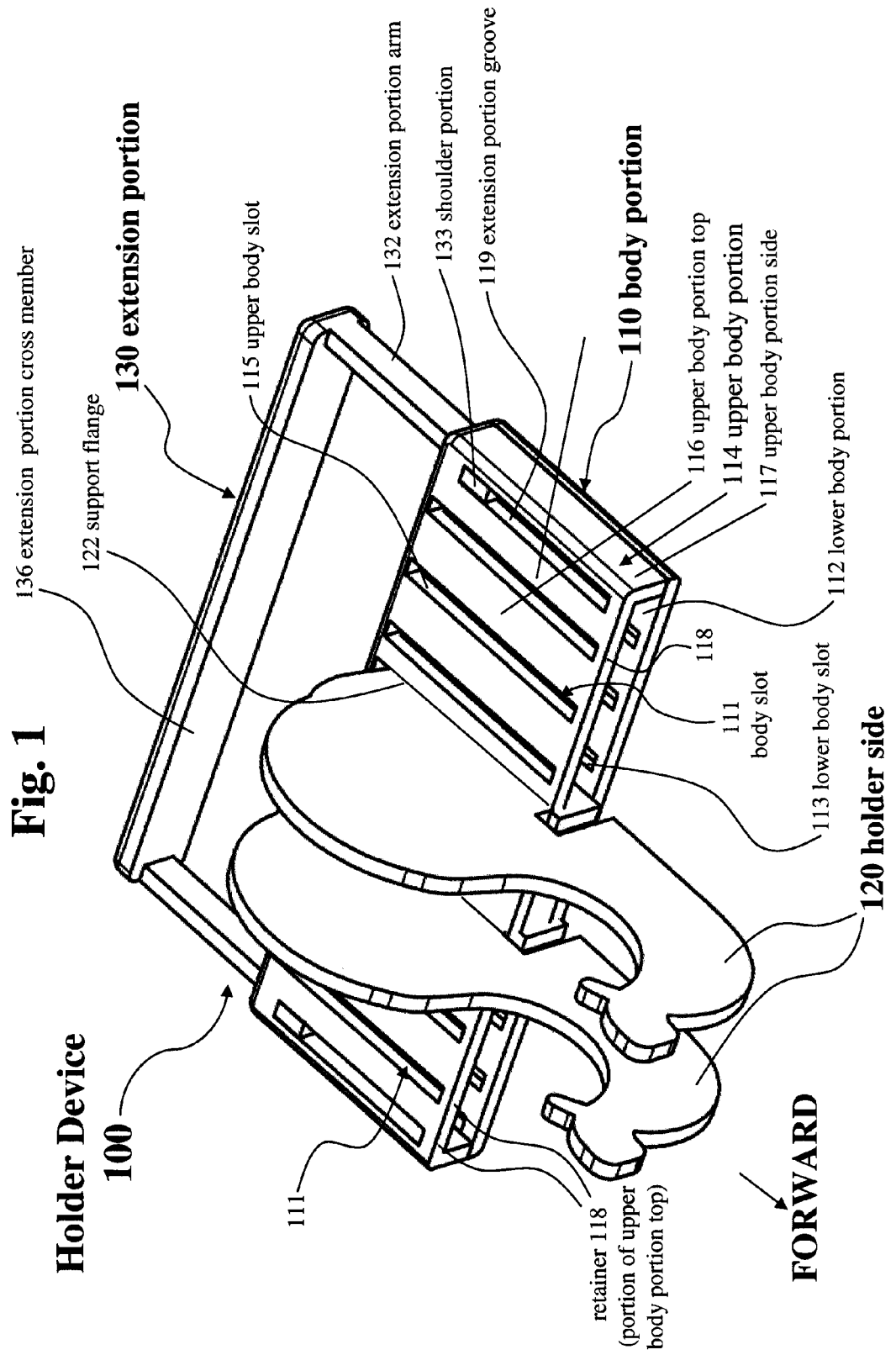
FIG. 1 is a perspective view showing a holder device in accordance with one embodiment of the invention.

FIG. 1 is a perspective view showing a holder device 100 in accordance with one embodiment of the invention. The holder device 100 includes a body portion 110, a pair of holder sides 120, and an extension portion 130.

The body portion 110 includes both a lower body portion 112 and an upper body portion 114. The lower body portion 112 and the upper body portion 114 may be fastened together in some manner as shown, such as by adhesive or some other bonding. Alternatively, the lower body portion 112 and the upper body portion 114 may be integrally formed, such as by molding, for example. The upper body portion 114 may include a upper body portion top 116 and a upper body portion side 117, as shown in FIG. 1. As shown, the upper body portion top 116 and the upper body portion side 117 might form a U shape. Accordingly, each upper body portion side 117 may be attached to an end, i.e., a distal end, of the lower body portion 112, such that the upper body portion top 116, the upper body portion side 117, and the lower body portion 112 collectively define the cavity therein.

The lower body portion 112 is provided with a plurality of lower body slots 113 in accordance with one embodiment of the invention. In a similar manner, the upper body portion 114 may be provided with a plurality of upper body slots 115. A corresponding lower body slot 113 and upper body slot 115 together form a body slot 111, and together serve to accept a respective holder side 120. That is, one lower body slot 113 along with one upper body slot 115 serves to support a holder side 120, as shown in FIG. 1. More specifically, as shown in both FIG. 1 and FIG. 6, each holder side 120 may be provided with a support flange 122 which forms a lower portion of a holder side 120. The support flange 122 engages with a lower body slot 113 and a corresponding upper body slot 115—so as to retain and support a holder side 120. This engagement is assisted by a securement groove 124, described further below.

In accordance with one embodiment of the invention, the holder device 100 includes two holder sides 120. However, it is also appreciated that only one or more than two holder sides 120 may be used in other arrangements of the holder device 100 of the invention. For example, additional holder sides 120 might be utilized for larger or heavier items, or for multiple items.

The holder sides 120 may take on a variety of shapes and arrangements, as further discussed below. In the embodiment of FIG. 1, the holder sides 120 are in the form of an elephant head. The particular design of an elephant head provides a functional advantage in that such arrangement allows a personal electronic device to sit at an angle, i.e., with the back of the personal electronic device resting on what might be characterized as the forehead of the elephant (the main support portion 126 as shown in FIG. 5), and with the end of the trunk (of the elephant head) curved (the recessed portion 127 as shown in FIG. 5)—so as to retain the personal electronic device without slipping. The tip of the trunk (the catch portion 128 of FIG. 5) may be provided to catch the lower edge of a supported device. However, various other arrangements and shapes might be utilized so as to provide the same or similar functionality. That is, various other shapes and/or other semblances may be provided that include the main support portion 126, the recessed portion 127 and the catch portion 128, so as to provide the functional attributes shown in FIGS. 1 and 5, for example.

Figure 4:
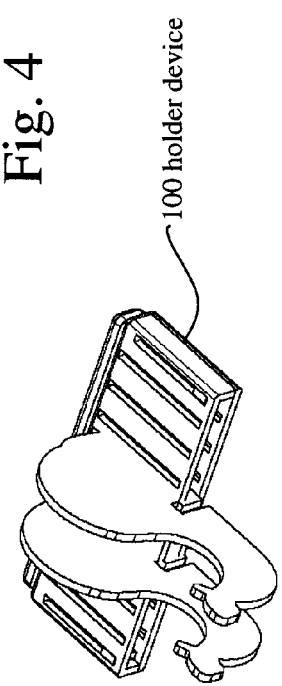
FIG. 4 is a perspective view showing the holder device with the holder sides spaced close together in accordance with one embodiment of the invention.

FIG. 1 also shows that the holder device 100 includes an extension portion 130, which includes a extension portion cross member 136 and a pair of extension portion arms 132, in accordance with one embodiment of the invention. As shown in FIG. 1, the extension portion cross member 136 and the two extension portion arms 132 (which make up the extension portion 130) may constitute a U shaped arrangement. The extension portion 130 may be selectively stowed inside the body portion 110 as shown in FIG. 4, for example. Alternatively, the extension portion 130 may be disposed in an extended position (as shown in FIG. 1). The extension portion 130 may be moved from the stowed position to the extended position via the extension portion arms 132, as shown. In accordance with one embodiment of the invention, each extension portion arm 132 is provided with a shoulder portion 133. Each shoulder portion may be disposed at a distal end of a respective extension portion arm 132. Each shoulder portion 133 is received in a respective extension portion groove 119. The extension portion grooves 119 are disposed in respective sides of the upper body portion 114, as shown. Accordingly, the arrangement of the shoulder portion 133 (of the extension portion arm 132) vis-à-vis the extension portion groove 119 allows the extension portion 130 to be selectively extended from the stowed position to the extended position (or any position in between the stowed position and the extended position) while retaining the extension portion 130 in a connected arrangement vis-à-vis the body portion 110. In accordance with one embodiment of the invention, the lower body portion 112 may also be provided with extension portion grooves (not shown) which engage with corresponding shoulder portions in the extension portion arm 132 (not shown).

The extension portion 130 may be used to provide further stability to the holder device 100 so as to prevent tipping or other undesired movement of the holder device 100. For example, the extension portion 130 may be particularly useful when the holder device 100 is utilized to hold a heavier, larger or odd shaped personal electronic device.

Figure 2:
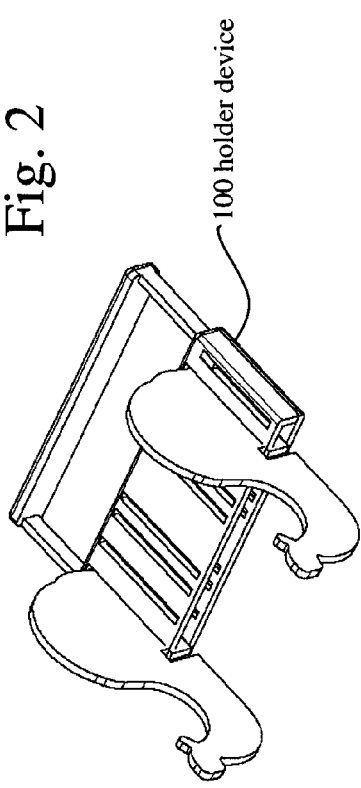
FIG. 2 is a perspective view showing the holder device with the holder sides spaced far apart and with the extension portion extended in accordance with one embodiment of the invention.

FIG. 2 is a perspective view showing the holder device 100 with the holder sides 120 spaced far apart and with the extension portion 130 extended in accordance with one embodiment of the invention. Accordingly, the arrangement of FIG. 2 may be used to hold a device that is wider than a typical cell phone or PDA, for example, such as a small monitor.

Figure 3:
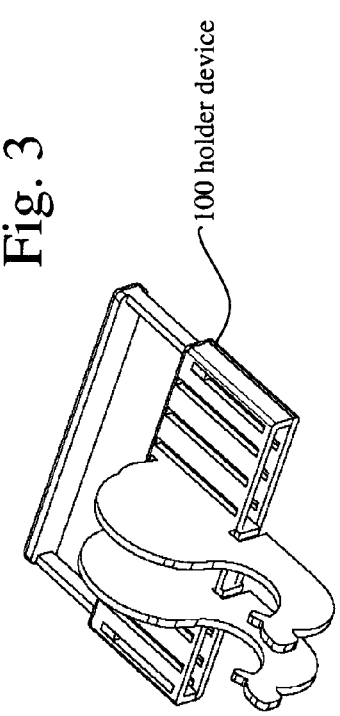
FIG. 3 is a perspective view showing the holder device with the holder sides spaced close together and with the extension portion extended in accordance with one embodiment of the invention.

In an alternative arrangement, FIG. 3 is a perspective view showing the holder device 100 with the holder sides 120 spaced close together and with the extension portion 130 extended in accordance with one embodiment of the invention. It is appreciated that as the holder sides 120 are moved closer together, the stability of the holder device 100 will tend to decrease. However, such decreased stability may well be acceptable, such as with a smaller device or a device with which the user does not engage while being supported on the holder device 100, i.e., a personal electronic device that the user would remove from the holder device 100 prior to manipulating keys of the device, for example. In accordance with another aspect of the invention, the holder sides 120 may be positioned differently (i.e., closer together or farther apart) depending on whether the personal electronic device is positioned vertically or on its side.

FIG. 4 is a perspective view showing the holder device 100 with the holder sides 120 spaced close together and with the extension portion 130 unextended in accordance with one embodiment of the invention. Accordingly, the arrangement of the device 100 as shown in FIG. 4 may provide the least stability of the arrangements of FIGS. 2-4.

FIG. 5 is a side view of a holder side 120 in accordance with one embodiment of the invention. As described above, FIG. 5 shows the holder side 120 including a main support portion 126, a recessed portion 127 and a catch portion 128.

FIG. 6 is a perspective view of a holder side 120 in accordance with one embodiment of the invention. In accordance with one embodiment of the invention, the body portion 110 (and specifically the support flange 122) may be provided with a securement groove 124. As shown, the securement groove 124 may be provided with an "L" shape. The securement groove 124 allows the holder side 120 to be positioned over the upper body portion 114; moved vertically down and into an upper body slot 115 and lower body slot 113; and then moved forward (i.e., "forward" as depicted in FIG. 1). The securement groove 124 thus engages with a retainer 118 of the upper body portion top 116. The retainer 118 may be simply constituted by a portion of the upper body portion top 116 that is positioned at the forward end of each of the upper body slots 115. Accordingly, the securement groove 124 of the holder side 120 allows more secure engagement of the holder side 120 with the body portion 110.

FIG. 7 is a top view of the body portion 110 with the extension portion 130 separated in accordance with one embodiment of the invention.

FIG. 8 is a perspective view of the body portion 110 in a packed arrangement in accordance with one embodiment of the invention.

FIG. 9 is a further perspective view of the body portion 110 in a packed arrangement, from a different angle, in accordance with one embodiment of the invention. Accordingly, the body portion 110 (including the lower body portion 112 and the upper body portion 114) may function as a case to retain both the holder sides 120 as well as the extension portion 130. In accordance with one embodiment of the invention, the holder sides 120 (disposed together) my be dimensioned so as to be frictionally and removably retained, i.e., stowed, within the interior space of the body portion 110.

Figure 10:
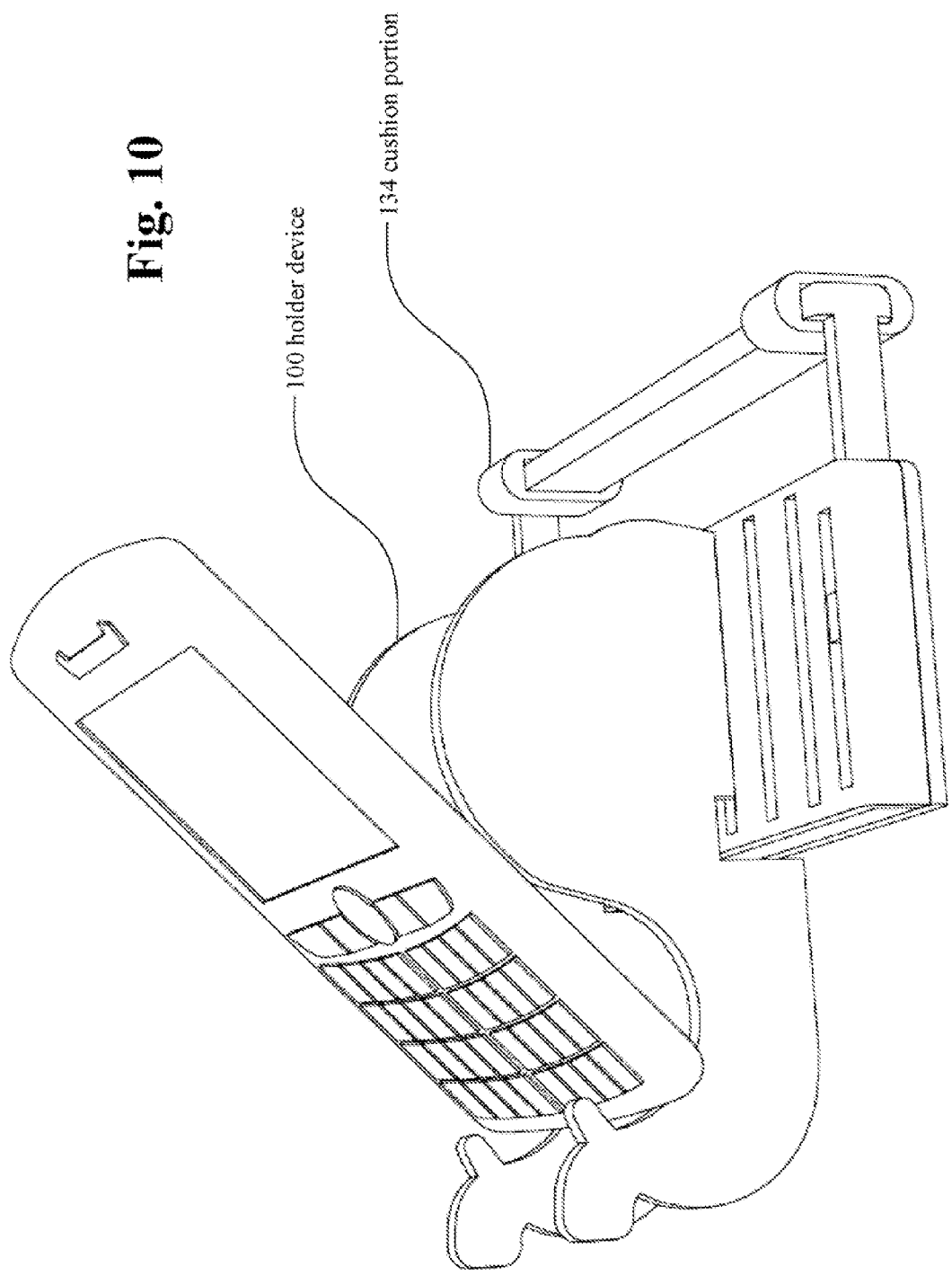
FIG. 10 is a perspective view of the holder device holding a PDA in accordance with one embodiment of the invention.

FIG. 10 is a perspective view of the holder device 100 holding a PDA in accordance with one embodiment of the invention. In accordance with one embodiment of the invention, the extension portion 130 may be provided with one or more cushion portions 134. Each cushion portion may be disposed on the extension portion 130 (as shown) so as to provide a cushioned interface and/or offer resistant to slippage, for example. More specifically, a plurality of cushion portions 134 may be positioned on the extension portion cross member 136 in accordance with one embodiment of the invention. The cushion portions 134 may be constructed of rubber or any other suitable material, for example.

Figure 11:
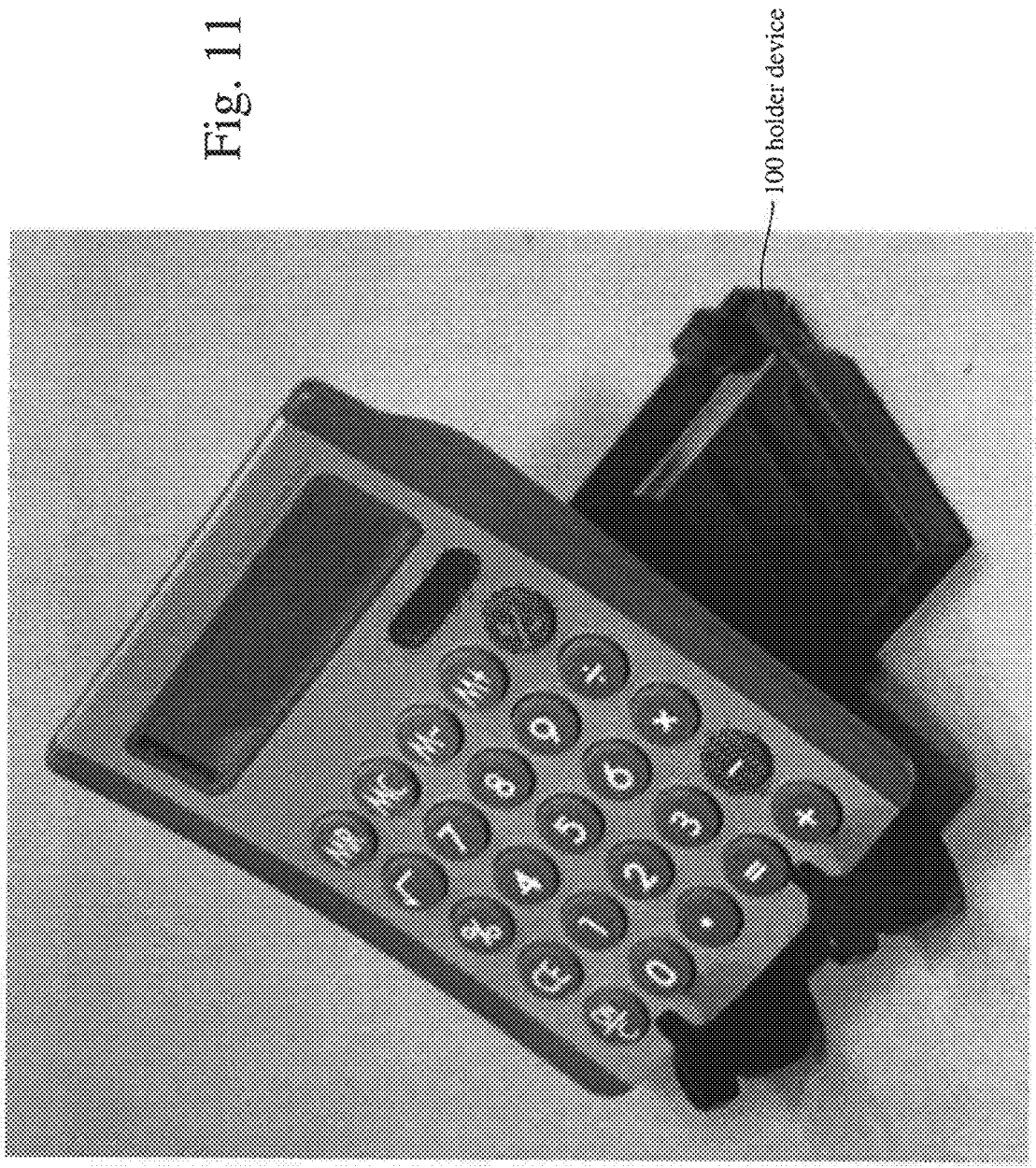
FIG. 11 is a perspective view of the holder device holding a calculator in accordance with one embodiment of the invention.

FIG. 11 is a perspective view of the holder device 100 holding a calculator in accordance with one embodiment of the invention. As shown in both FIGS. 10 and 11, it is appreciated that a particular personal electronic device may be used while supported on the holder device 100.

Figure 12:
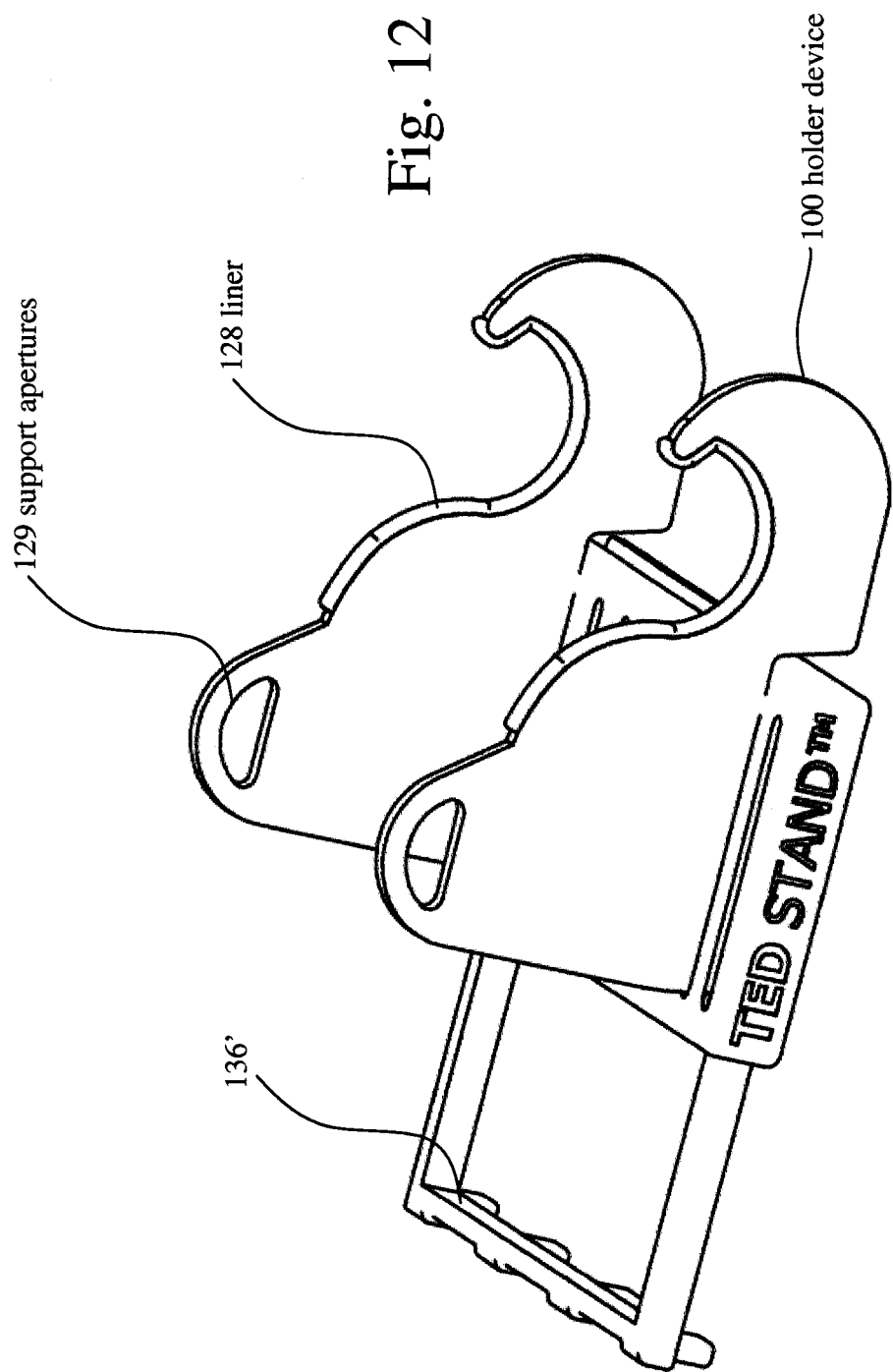
FIG. 12 is a perspective view of the holder device in accordance with one embodiment of the invention.

FIG. 12 is a perspective view of the holder device in accordance with a further embodiment of the invention. As shown, the holder device 100 may include a rubber (or other suitable material) liner 101 so as to cushion and frictionally retain (for example) an item thereon. Further, the holder device 100 may include support apertures 129. The support apertures 129 may be used to move the holder device 100 or to secure an item upon the holder device 100, for example. For example, a clip or line might be attached to the support apertures 129 and to the particular item supported on the holder device 100.

FIG. 12 shows a extension portion cross member 136' of different construction than the extension portion cross member 136 described above. The extension portion cross member 136' may be provided with various shape and/or projections so as to either further secure and/or support the holder device 100 in a particular disposition. Lastly, FIG. 12 shows that the holder device 100 may be provided with indicia to identify a name of the device or maker, for example, i.e., in this case TED STAND, for example.

The device of the invention in accordance with the various embodiments may be made from any of a wide variety of materials, as is desired. For example, one embodiment of the invention is made of plastic. However, the invention, in whole or in part, might be made of wood, plastic, metal, ceramic, or rubber, for example, or any other material.

The holder device 100 may be used to support any of a wide variety of personal electronic device, or other items, and is not limited to those described above. Accordingly, the holder device 100 may be used to support a cell phone, other telephone, personal digital assistant (PDA), calculator, monitor, remote control unit, or other personal electronic device, or any other item, such as a recipe card, for example.

In conclusion, it will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A holder device for supporting an item upon the holder device, the holder device comprising:
a body portion including a plurality of body slots;
a plurality of holder sides, each holder side including a support flange, the support flange of each respective holder side removably positioned in a respective body slot; and
the plurality of holder sides supported so as to be parallel to each other, the plurality of holder sides adapted to support the item thereon; and
the body portion including an upper body portion and a lower body portion, and the upper body portion and a lower body portion defining a cavity therebetween; and
the upper body portion including a plurality of upper body slots; and the lower body portion including a plurality of lower body slots; and
each upper body slot is paired with, and aligned over, a lower body slot, so as to constitute a body slot; and
the upper body portion constituted by an upper body portion top and an upper body portion side; and
the upper body portion top and the upper body portion side collectively forming a U shape.

2. The holder device of claim 1, each holder side including a main support portion, a recessed portion, and a catch portion; and
the main support portion, a recessed portion, and a catch portion dimensioned such that the item is leanable against the main support portion with a lower portion of the item disposed in the recessed portion, and such that the catch portion prevents the item from leaning back and out of the recessed portion.

3. The holder device of claim 2, wherein the plurality of holder sides are dimensioned such that the item is similarly positionable upon each holder side.

4. The holder device of claim 3, the holder side further including a support flange, the support flange removably positioned in a respective body slot.

5. The holder device of claim 1, the upper body portion side attached to the lower body portion at respective opposed distal ends of the lower body portion.

6. The holder device of claim 5, the holder side further including a support flange, the support flange removably positioned in a respective body slot.

7. The holder device of claim 6, each holder side including a securement groove, the securement groove defining in part the support flange.

8. The holder device of claim 7, the securement groove engaging a retainer of the upper body portion.

9. The holder device of claim 8, the retainer of the upper body portion disposed at an end of the particular body slot in which the particular holder side is disposed, the retainer of the upper body portion being integrally formed with the upper body portion.

10. The holder device of claim 1, each holder side including a securement groove, the securement groove defining in part a support flange of the holder side; and
the securement groove engaging a retainer of the upper body portion.

11. The holder device of claim 10, the retainer of the upper body portion disposed at an end of the particular body slot in which the particular holder side is disposed, the retainer of the upper body portion being integrally formed with the upper body portion.

12. The holder device of claim 1, further including an extension portion that is positionable between a first position and a second position, and
the extension portion includes a pair of extension portion arms connected to an extension portion cross member; and
in the first position the extension portion arms are substantially contained within the body portion and the extension portion cross member is adjacent and in contact with the body portion; and in the second position, the extension portion arms are substantially extended from the body portion and the extension portion cross member is positioned away from the body portion, such that the extension portion provides a support for the holder device.

13. The holder device of claim 12, the pair of extension portion arms connected to the extension portion cross member collectively in a U shape.

14. The holder device of claim 1, the body portion further including extension portion grooves, and each extension portion arm including a shoulder portion at a distal end thereof opposed to an end that is connected to the extension portion cross member; and each shoulder portion engaging with a respective extension portion grooves so as to provide the slidable movement of the extension portion.

15. The holder device of claim 1, each holder side is in the semblance of an elephant.

16. The holder device of claim 1, the holder device constructed of plastic.

17. A holder device for supporting an item upon the holder device, the holder device comprising:

a body portion including a plurality of body slots;

a plurality of holder sides, each holder side including a support flange, the support flange of each respective holder side removably positioned in a respective body slot; and the plurality of holder sides supported so as to be parallel to each other, the plurality of holder sides adapted to support the item thereon;

each holder side including a main support portion, a recessed portion, and a catch portion;

the main support portion, a recessed portion, and a catch portion dimensioned such that the item is leanable against the main support portion with a lower portion of the item disposed in the recessed portion, and such that the catch portion prevents the item from leaning back and out of the recessed portion;

the plurality of holder sides are dimensioned such that the item is similarly positionable upon each holder side;

the holder side further including a support flange, the support flange removably positioned in a respective body slot; and the holder device further including an extension portion that is positionable between a first position and a second position, and the extension portion includes a pair of extension portion arms connected to an extension portion cross member; and in the first position the extension portion arms are substantially contained within the body portion and the extension portion cross member is adjacent and in contact with the body portion; and in the second position, the extension portion arms are substantially extended from the body portion and the extension portion cross member is positioned away from the body portion, such that the extension portion provides a support for the holder device.

* * * * *